(12) United States Patent
Mossner et al.

(10) Patent No.: US 7,556,523 B2
(45) Date of Patent: Jul. 7, 2009

(54) WALL OUTLET

(75) Inventors: Frank Mossner, Berlin (DE); Ferenc Nad, Berlin (DE); Ulrich Hetzer, Berlin (DE)

(73) Assignees: ADC GmbH, Berlin (DE); Harting Electric GmbH & Co. KG, Espelkamp (DE)

( * ) Notice: Subject to any disclaimer, the term of this patent is extended or adjusted under 35 U.S.C. 154(b) by 53 days.

(21) Appl. No.: 10/577,693

(22) PCT Filed: Oct. 8, 2004

(86) PCT No.: PCT/EP2004/011307

§ 371 (c)(1),
(2), (4) Date: Dec. 20, 2006

(87) PCT Pub. No.: WO2005/048431

PCT Pub. Date: May 26, 2005

(65) Prior Publication Data

US 2007/0117428 A1    May 24, 2007

(30) Foreign Application Priority Data

Oct. 29, 2003    (DE) ................................. 103 50 433

(51) Int. Cl.
*H01R 13/58* (2006.01)
(52) U.S. Cl. ........................................ 439/456; 439/906
(58) Field of Classification Search .................. 439/456, 439/459, 906
See application file for complete search history.

(56) References Cited

U.S. PATENT DOCUMENTS

| | | | | |
|---|---|---|---|---|
| 4,272,148 A * | 6/1981 | Knack, Jr. ................... | 439/455 |
| 4,632,489 A * | 12/1986 | Skinner ....................... | 439/459 |
| 4,964,815 A * | 10/1990 | Kawai et al. ................. | 439/610 |
| 5,409,400 A * | 4/1995 | Davis .......................... | 439/610 |
| 5,975,956 A * | 11/1999 | Huguenet .................... | 439/607 |
| 6,225,557 B1 * | 5/2001 | Fonteneau et al. ............ | 174/50 |
| 6,431,905 B2 * | 8/2002 | Verbeek et al. ............. | 439/456 |
| 6,773,296 B2 * | 8/2004 | Kihira et al. ................. | 439/445 |
| 6,869,309 B2 * | 3/2005 | Ziegler et al. ............... | 439/504 |
| 7,198,506 B2 * | 4/2007 | Furuya et al. ............... | 439/456 |
| 7,208,687 B2 | 4/2007 | Hetzer et al. | |
| 7,223,119 B2 * | 5/2007 | Droesbeke .................. | 439/456 |
| 2001/0024904 A1 * | 9/2001 | Fischer ....................... | 439/456 |
| 2003/0100214 A1 * | 5/2003 | Miyamoto et al. .......... | 439/456 |
| 2006/0170070 A1 | 8/2006 | Hetzer et al. | |
| 2006/0191210 A1 | 8/2006 | Hetzer et al. | |
| 2006/0191699 A1 * | 8/2006 | Hetzer et al. ............. | 174/50.51 |

(Continued)

FOREIGN PATENT DOCUMENTS

DE    196 04 564    3/1997

(Continued)

*Primary Examiner*—James Harvey
(74) *Attorney, Agent, or Firm*—Merchant & Gould P.C.

(57) ABSTRACT

The invention relates to a wall outlet comprising a base part having at least one first opening which is used to receive an electric cable, and a cover. The cover or the base part comprise at least one second opening wherein an electric socket can be inserted. A cable guiding element is arranged in the base part, said cable guiding element enabling the electric cable to be guided in a defined manner from the first opening to the second opening.

19 Claims, 6 Drawing Sheets

U.S. PATENT DOCUMENTS

2007/0117428 A1* 5/2007 Mossner et al. .............. 439/138
2008/0041854 A1 2/2008 Mossner et al.

FOREIGN PATENT DOCUMENTS

| EP | 1 170 842 | 8/1984 |
| GB | 2 300 764 | 11/1996 |
| JP | 50-5978 | 1/1975 |
| JP | 7-63374 | 3/1995 |
| JP | 3036124 | 1/1997 |
| JP | 9-243859 | 9/1997 |
| JP | 9-293570 | 11/1997 |
| JP | 10-302875 | 11/1998 |
| TW | 400664 | 8/2000 |
| TW | 449172 | 8/2001 |

* cited by examiner

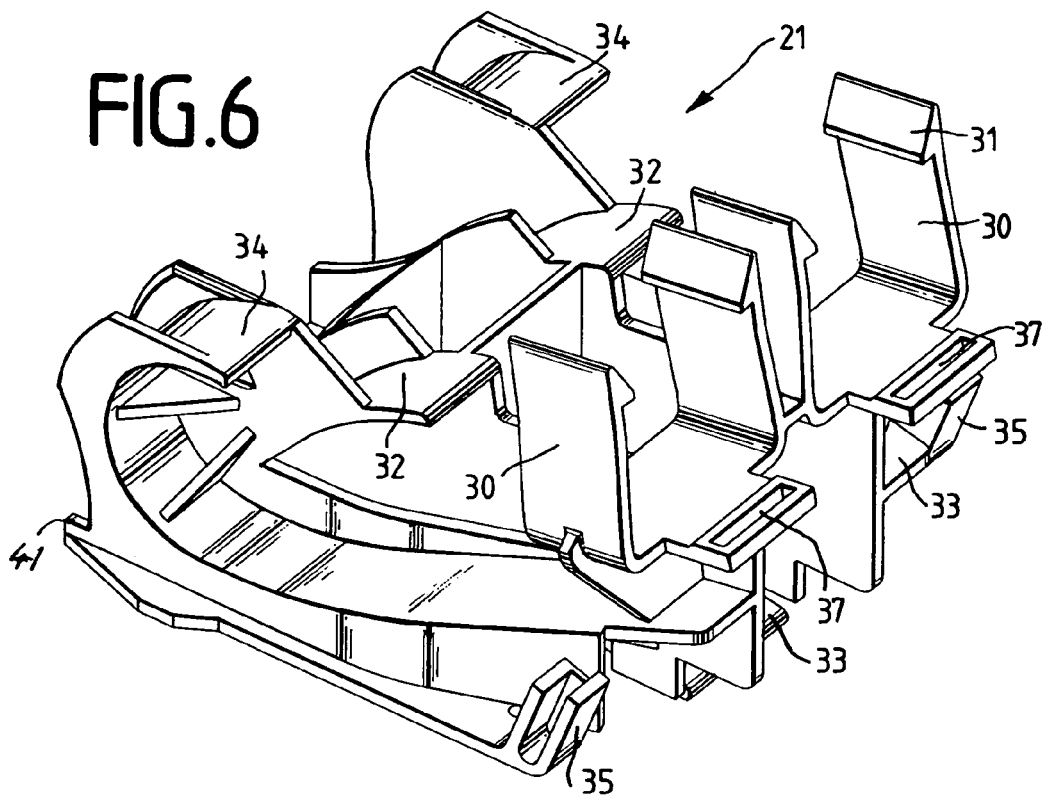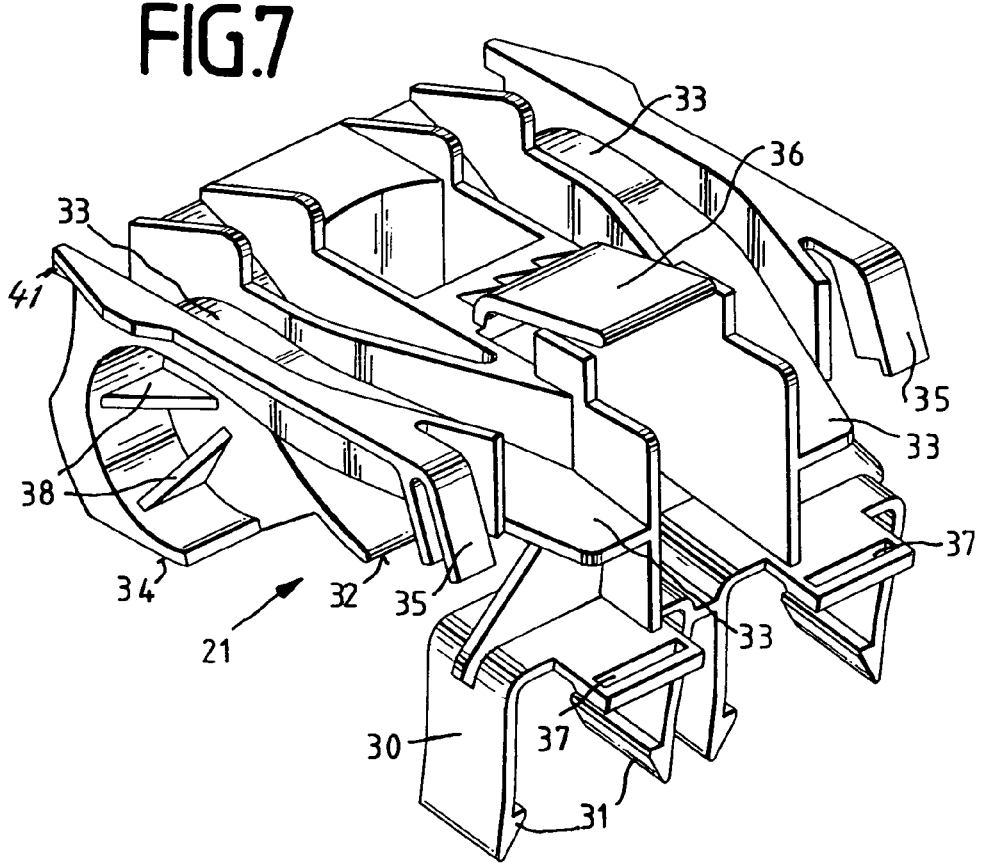

WALL OUTLET

BACKGROUND

Wall outlets are used, for example, in production halls in the industrial field, and have a lower part and a cover. The lower part is mounted on the wall, with the cover being hinged, for example by means of a hinge on the lower part, and possibly being screwed to the lower part. The cover and/or the lower part have a first opening via which an electrical cable can be passed into the wall outlet. The cover and/or the lower part furthermore have/has a second opening, in which an electrical socket is arranged. In this case, the socket may be placed in front of the second opening, from the outside or from the inside. The electrical cable is then connected to the socket. An electrical appliance can then be connected to the cable by plugging a suitable plug into the socket, in order in this way to receive and/or to transmit data. It is also known for a protective cap to be provided in front of the socket, which protects the socket against dirt and/or moisture and/or water spray when no plug is inserted. The known wall outlet has the disadvantage that it is not suitable for data cables with very high transmission rates such as Category 5 or Category 6.

SUMMARY

The invention is based on the technical problem of providing a wall outlet which allows data cables for high transmission rates to be connected.

In one preferred embodiment, the cable routing element is detachably connected to the lower part. In addition to simple production as well as a further degree of freedom for the choice of different materials for the lower part and cable routing element, this, in conjunction with further features, also has a further advantage, which will be explained later.

In a further preferred embodiment, the lower part has two first openings and the cover has two second openings, so that two electrical cables can be connected by means of the wall connecting box.

In a further preferred embodiment, flaps which can pivot are arranged on the cover and can be used to close the second openings. This means that no dirt or moisture can enter the socket when no plug is inserted. The flap is preferably prestressed by means of a spring for this purpose.

In a further preferred embodiment, the flap has a latching trough, and the cover has a latching tab, so that the flap is also latched when it is folded closed.

In a further preferred embodiment, hinge-like shafts are arranged on both end surfaces on the lower part and, on the end surface opposite the second openings, the cover has attachment means which correspond to the hinge-like shafts. The cover can thus optionally be hinged on both end surface faces of the lower part, so that the first and second openings are optionally on the same or on the opposite end surface face. The detachable cable routing element is then preferably rotated through 180° in the lower part for this purpose.

In a further preferred embodiment, the cable routing element has elements in the form of springs. The elements in the form of springs result in the cable routing element, and the sockets which are connected to the cable routing element, being aligned in a defined manner with respect to the second opening.

In a further preferred embodiment, the cover has lead-sealing hooks. When the flaps are closed, that is to say when no plug is inserted, these lead-sealing hooks allow the wall outlet to be lead-sealed, thus making unauthorized access more difficult.

In a further preferred embodiment, a seal is arranged between the lower part and the cover, with holes for attachment screws preferably being arranged away from the seal.

In a further preferred embodiment, installation instructions are fitted on the lower face of the cover and/or on the upper face of the lower part. The purpose of this is, for example, to indicate to the technician the point at which the electrical cable must be cut off.

In a further preferred embodiment the cover has a lid, and the lid has a seal. By way of example, it is possible to arrange inscriptions under the lid, which is preferably transparent, which are then protected against water spraying and moisture, by means of the seal.

In a further preferred embodiment, at least one hinge-like shaft is arranged on at least one end surface of the lower part, and the cover has corresponding attachment means, with the hinge-like shaft having a latching depression and the corresponding attachment means having a latching tab, so that the cover latches in over a limit value when it is folded up. The limit value is preferably in the region of 160°. In particular, this simplifies retrospective installation work, since the cover can effectively be moved to a working position where it does not provide any disturbance but is still attached to the lower part in a captive manner. For example, this means that there is no need to place the cover on the floor, which may be damp.

BRIEF DESCRIPTION OF THE DRAWINGS

The invention will be explained in more detail in the following text with reference to a third exemplary embodiment. In the figures:

FIG. 6 shows a perspective plan view of the cable routing element, and FIG. 7 shows a perspective view of the cable routing element from underneath.

DETAILED DESCRIPTION

Figure 1:
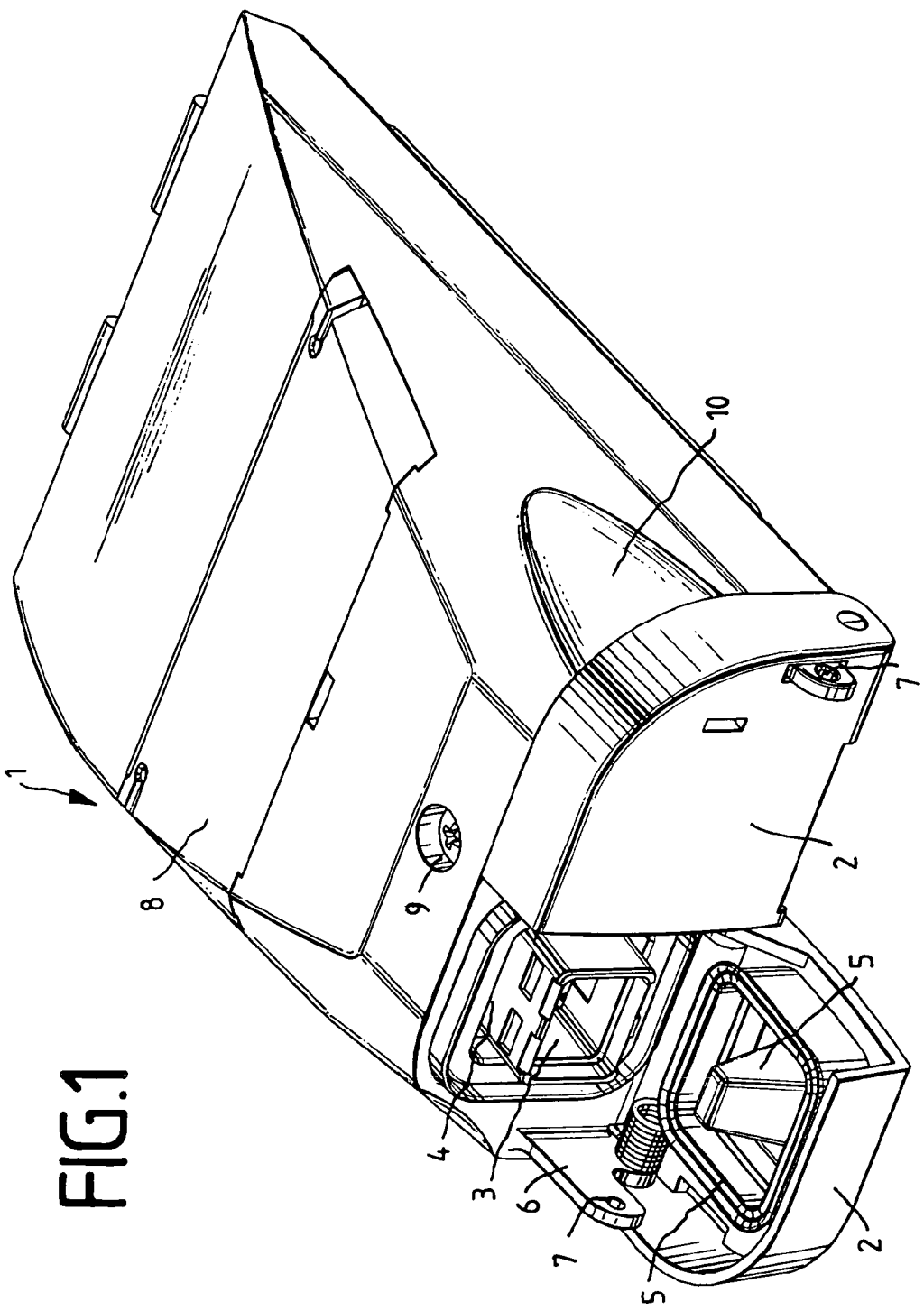
FIG. 1 shows a perspective plan view of a cover.

FIG. 1 shows the cover 1 of the wall outlet. The cover 1 has two flaps 2, by means of which second openings 3 in an end surface of the cover 1 can be closed. In this case, the right-hand flap 2 is shown in the closed state, and the left-hand flap 2 is shown in the open state. An attachment 4 is inserted in the second opening and is matched to a plug that can be inserted. A socket is then arranged behind this attachment 4, as will be explained in more detail later. Sealing elements 5 are arranged on the inner face of the flap 2 and, in the closed state, protect the opening 3 with the attachment 4 hermetically against moisture and dirt. Two lead-sealing hooks 6 are arranged at the side on the end face and, when the flap 2 is in the closed state, project through openings in the flap 2. A wire can then be passed through holes 7 within the lead-sealing hooks 6 and can be lead-sealed, thus making unauthorized access more difficult and making it evident. An inscription area with a lid 8 is arranged on the upper face of the cover 1, as well as a hole 9 by means of which the cover can be screwed to the lower part. Troughs 10 are formed at the side on the cover 1 in the area of the flaps 2 and are used as intentional pressure points for opening the flap 2. The flaps 2 are on the one hand prestressed by means of a spring and are latched by means of a latching tab, which is not illustrated, on the cover and a latching trough on the flap. This then simplifies the latching, since force is applied obliquely via the troughs 10.

Figure 2:
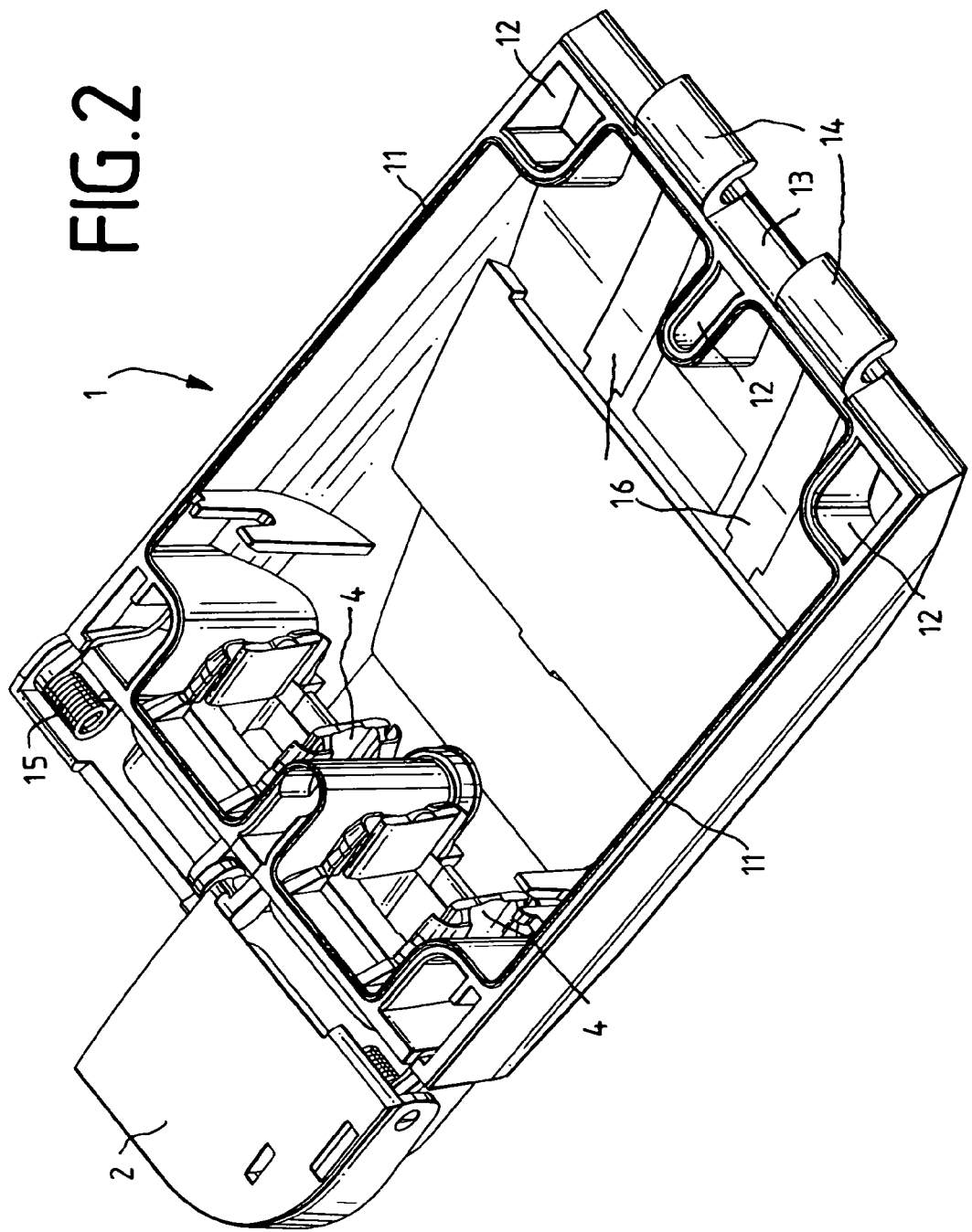
FIG. 2 shows a perspective view of the cover from underneath.

FIG. 2 shows a view of the cover from underneath. In this case, a groove 11 for sealing runs virtually over the entire circumference of the cover 1, with the holes 12 for screws being arranged away from the groove 11. Two attachment means 14 are arranged on the opposite end face 13 of the flaps 2. On the lower face, the attachment means 14 each have a latching tab, whose function will be explained later. As can also be seen, the two attachments 4 project into the cover. The spring 15 which prestresses the flap 2 can be seen at the top, on the right. Installation aids 16 are also fitted to the lower face of the cover 1, which, for example, make it possible to see how far an electrical cable must be cut off or stripped of insulation.

Figure 3:
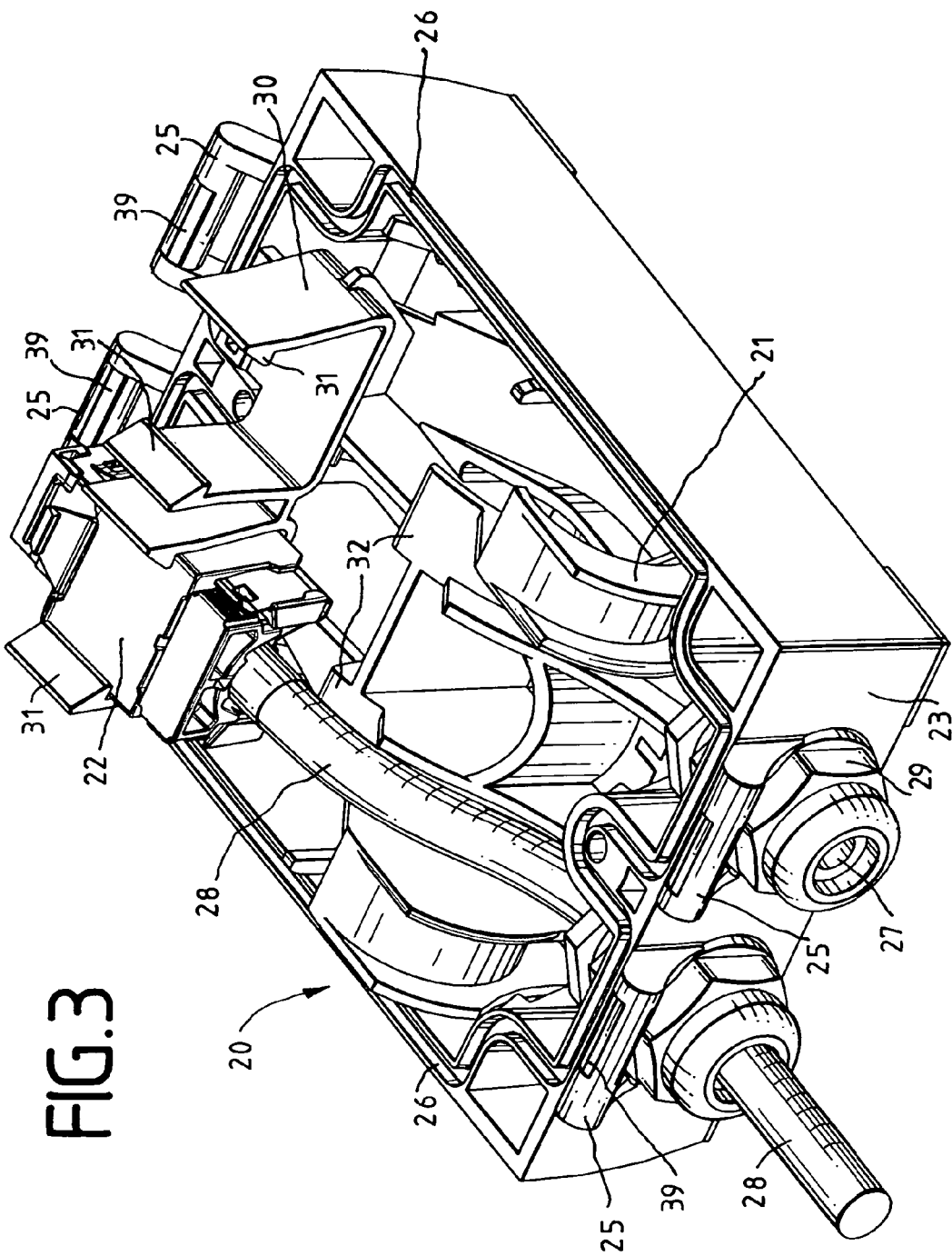
FIG. 3 shows a perspective plan view of a lower part with a cable routing element inserted as well as sockets in a first operating mode.

FIG. 3 shows the lower part 20 of the wall outlet box with an inserted cable routing element 21 as well as sockets 22. Two hinge-like shafts 25 are arranged on the respective two end faces 23 and 24 (see FIG. 5), and the cover 1 can be hinged by means of the attachment means 14 on the hinge-like shafts 25. A groove 26 for the seal 40 is provided virtually around the entire circumference of the lower part 20 (see FIGS. 4 and 5). On the end face 23, the lower part 20 has two first openings 27 for the electrical cables 28, and the openings 27 with the cables 28 can be sealed hermetically by means of sealing elements 29. The cable routing element 21 in each case has two U-shaped limbs 30, which are used for holding and securing the sockets 22. Clamping ribs 31 which point inwards are provided for this purpose on the upper face of the limbs 30 and slide over the upper face of the sockets 22. In a first operating mode, the cable routing element 21 is inserted into the lower part 20 such that the U-shaped limbs 30 rest on the end face 24. This is illustrated in FIG. 3. In this case, the cover 1 is hinged by means of the attachment means 14 on the hinge-like shafts 25 on the end face 23. This means that, when the wall outlet box is mounted on the wall and the electrical cables 28 come from above, then the tapping by means of the plug, which is not illustrated, is produced from underneath. In order to route the electrical cable 28 in a defined manner within the wall outlet box, it is passed through the opening 27, is passed via a first cable routing path 32 from the opening 27 to the socket 22, where the electrical wires in the cable 28 are connected. The hinge-like shafts 25 each have a latching depression 39, which is preferably arranged somewhat eccentrically. When the cover 1 is folded up through a limiting angle of, for example, 160°, the latching tab of the attachment means 14 slides into the latching depression, and locks the cover 1 in this position.

The cable routing path 32 is designed such that minimum bending radii of the electrical cable 28 for high data transmission rates are complied with, such as Category 6. As can be seen well, particularly in FIG. 6, the configuration of the cable routing path 32 results in positive routing, so that the technician cannot bend the cable 28 at less than the minimum bending radii, and cannot kink it at all.

Figure 4:
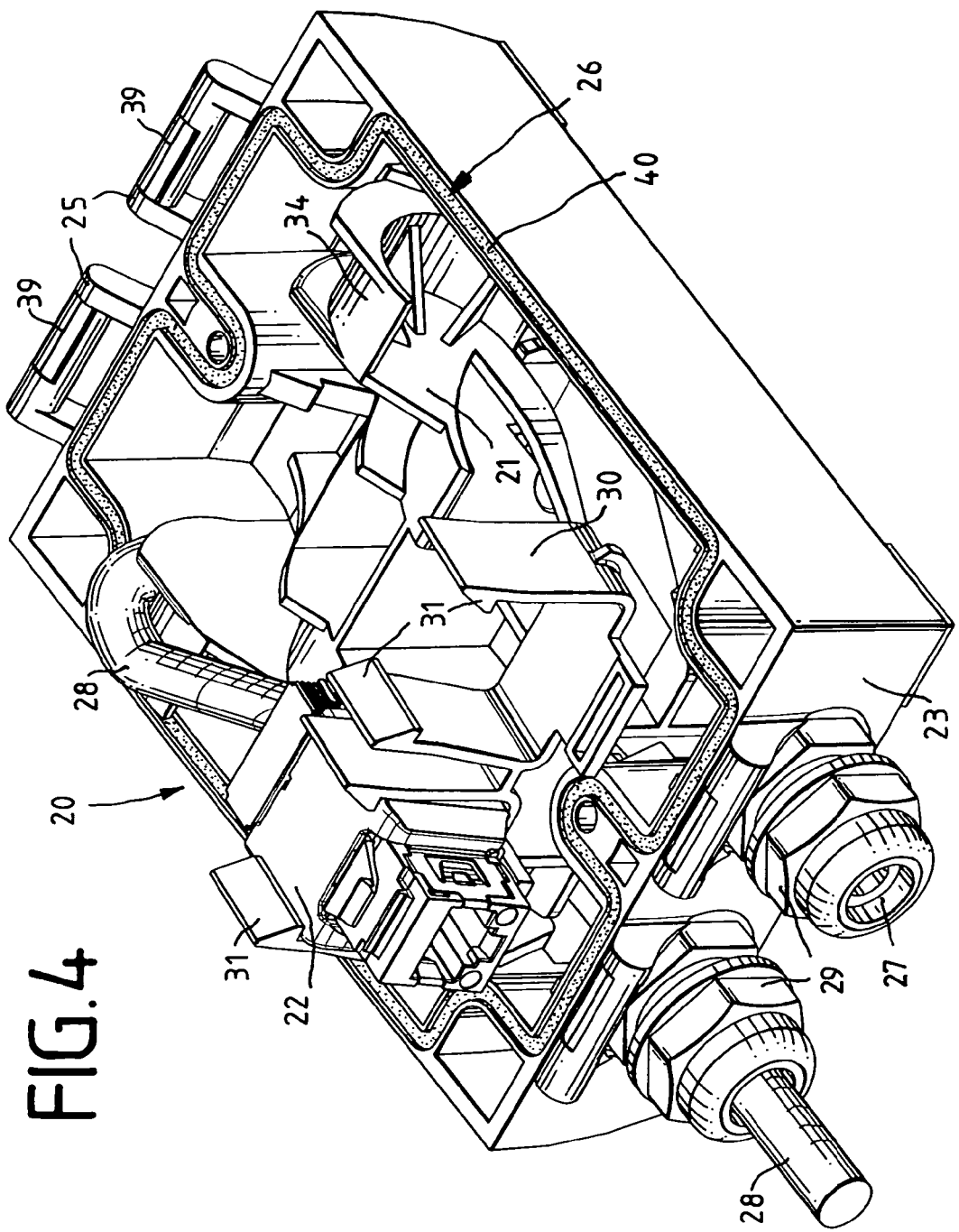
FIG. 4 shows a perspective plan view of the lower part with a cable routing element inserted as well as sockets in a second operating mode.
Figure 5:
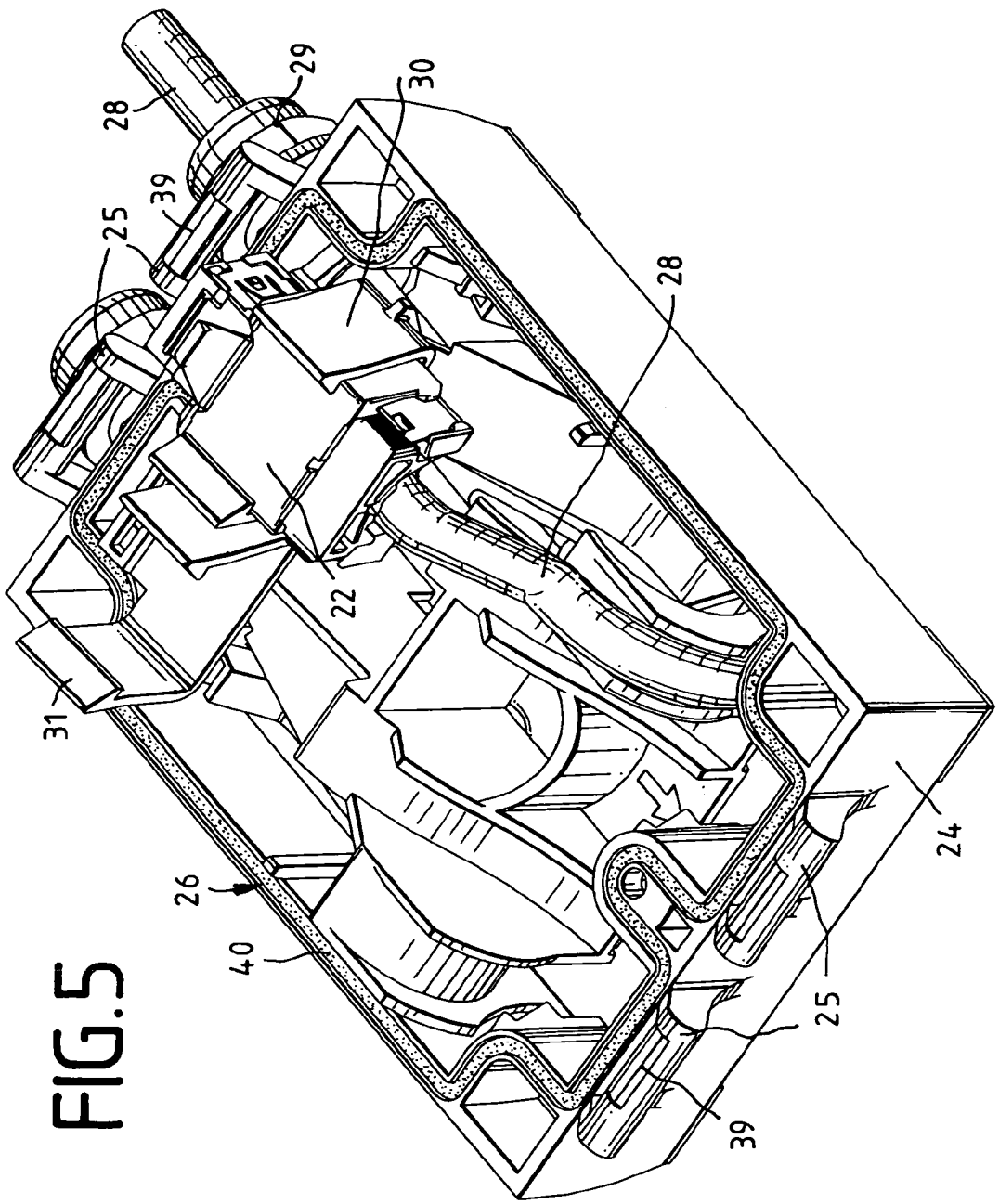
FIG. 5 shows a further perspective plan view of the lower part.

FIGS. 4 and 5 show a second operating mode, in which the cable routing element 21 is arranged rotated through 180° in the lower part 21, so that the U-shaped limbs 30 are arranged on the end face 23. In this case, the cover 1 is hinged by means of its attachment means 14 on the hinge-like shafts 25 on the end face 24. However, this requires different cable routing within the wall outlet. For this purpose, the electrical cable 28 is first of all passed from the opening 27 via the cable routing path 33 (see FIG. 6) from the end face 23 to the end face 24, where it is bent up and is passed via the cable routing path 34 to the socket 22.

The tapping by means of the plug can thus be provided optionally on the end face 23 or 24 by means of the detachable cable routing element 21 as well as the hinge-like shafts 25 which are arranged on the two end faces 23, 24. If, by way of example, the wall connecting box is mounted on the wall and the electrical cable 28 comes from underneath, then the second operating mode as shown in FIGS. 4 and 5 nevertheless makes it possible to ensure that the tapping by means of the plug is also feasible from underneath.

The cable routing element 21 is illustrated in detail in FIGS. 6 and 7. In addition to the elements which have already been described, the preferably integral cable routing element 21 has a pair of spring elements 35 which press the cable routing element 21 in a sprung manner against the inner face of the lower part 20. The cable routing element 21 also has a second spring element 36, which supports the cable routing element 21 is a sprung manner against the lower face of the lower part. In this case, the spring element 36 provides height alignment for the sockets 22, with the socket 22 being fixed in the longitudinal direction primarily by means of the stop edges 37. In order to increase the stiffness, the cable routing element 21 also has also has reinforcing ribs 38 in the area of the cable routing path 34. On the side opposite the spring elements 35, the cable routing element 21 has projections 41, which latch into corresponding recesses in the lower part 20.

LIST OF REFERENCE SYMBOLS

1 Cover
2 Flap
3 Opening
4 Attachment
5 Sealing element
6 Lead-sealing hook
7 Holes
8 Lid
9 Hole
10 Trough
11 Groove
12 Holes
13 End face
14 Attachment means
15 Spring
16 Installation aids
20 Lower part
21 Cable routing element
22 Sockets
23 End face
24 End face
25 Hinge-like shafts
26 Groove
27 Opening
28 Cable
29 Sealing element
30 U-shaped limb
31 Clamping ribs
32 Cable routing path
33 Cable routing path
34 Cable routing path
35 Spring element 36 Spring element
37 Stop edge
38 Reinforcing ribs
39 Latching depression
40 Seal
41 Projection

The invention claimed is:

1. A wall outlet comprising:
a lower part having first and second opposite end surfaces, wherein one of the end surfaces defines at least one first opening for holding an electrical cable;
a cover configured to mount to the lower part, wherein either the cover or the lower part defines at least one second opening configured to align with an electrical socket; and
a routing element configured to be selectively arranged in the lower part in either one of a first orientation and a second orientation, the second orientation being different from the first orientation, the routing element defining a first routing path configured to route the electrical cable from the first opening to the second opening when arranged in the first orientation and the routing element defining a second routing path configured to route the electrical cable from the first opening to the second opening when arranged in the second orientation.

2. The wall outlet as claimed in claim 1, wherein the routing element is detachably connected to the lower part.

3. The wall outlet as claimed in claim 1, wherein the lower part has two first openings, and the cover has two second openings.

4. The wall outlet as claimed in claim 3, wherein flaps which are configured to pivot are arranged on the cover, the flaps close the second openings when pivoted over the second openings.

5. A wall outlet comprising a lower part with at least one first opening for holding an electrical cable and having a cover, with the cover or the lower part having at least one second opening, into which an electrical socket can be inserted, wherein a routing element is arranged in the lower part, wherein the electrical cable can be routed in a defined manner from the first opening to the second opening, wherein at least one hinge-like shaft is arranged on at least one end surface of the lower part, and the cover has corresponding attachment means, with the hinge-like shaft having a latching depression and the corresponding attachment means having a latching tab, so that the cover latches in over a limiting angle when the cover is folded up.

6. The wall outlet as claimed in claim 1, wherein hinge-like shafts are arranged on the opposite end surfaces of the lower part and the cover has attachment means which are configured to mount to the hinge-like shafts on a selected one of the opposite end surfaces.

7. The wall outlet as claimed in claim 1, wherein the routing element includes springs.

8. The wall outlet as claimed in claim 1, wherein the cover has lead-sealing hooks.

9. The wall outlet as claimed in claim 1, wherein a seal is arranged between the lower part and the cover.

10. The wall outlet as claimed in claim 9, wherein holes for attachment screws are arranged in the cover away from the seal.

11. The wall outlet as claimed in claim 1, wherein installation instructions are fitted on either one of a lower face of the cover and on an upper face of the lower part.

12. The wall outlet as claimed in claim 1, wherein the cover has a lid, and the lid has a seal.

13. The wall outlet as claimed in claim 1, wherein at least one shaft is arranged on at least one of the end surfaces of the lower part, and the cover has corresponding attachment means, with the shaft having a latching depression and the corresponding attachment means having a latching tab, so that the cover latches in over a limiting angle when the cover is folded up.

14. The wall outlet as claimed in claim 1, wherein the routing element is configured to hold the electrical socket.

15. The wall outlet as claimed in claim 14, wherein the routing element is configured to hold the electrical socket adjacent to the first end surface when the routing element is arranged in the first orientation and wherein the routing element is configured to hold the plug socket adjacent to the second end surface when the routing element is arranged in the second orientation.

16. The wall outlet as claimed in claim 1, wherein the cover is configured to pivot with respect to the lower part from a closed position to an open position.

17. the wall outlet as claimed in claim 16, wherein the routing element is arranged in the first orientation when the second opening is defined adjacent the first end surface when the cover is arranged in the closed position; and wherein the routing element is arranged in the second orientation when the second opening is defined adjacent the second end surface when the cover is arranged in the closed position.

18. A wall outlet comprising a lower part with at least one first opening for holding an electrical cable and having a cover, with the cover or the lower part having at least one second opening, into which an electrical socket can be inserted, wherein a routing element is arranged in the lower part, wherein the electrical cable can be routed in a defined manner from the first opening to the second opening, wherein the routing element has elements in the form of springs.

19. A wall outlet comprising a lower part with at least one first opening for holding an electrical cable and having a cover, with the cover or the lower part having at least one second opening, into which an electrical socket can be inserted, wherein a routing element is arranged in the lower part, wherein the electrical cable can be routed in a defined manner from the first opening to the second opening, wherein the cover has a lid, and the lid has a seal.

* * * * *